G. W. BLAKE.
POURING SPOUT.
APPLICATION FILED DEC. 8, 1913.
1,124,996. Patented Jan. 12, 1915.
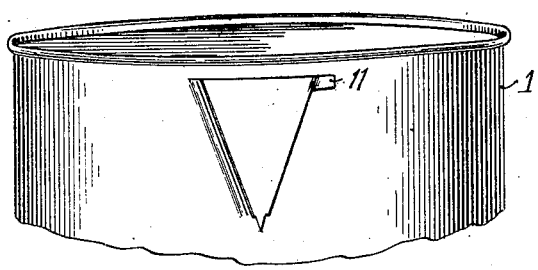
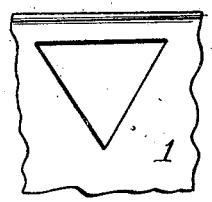
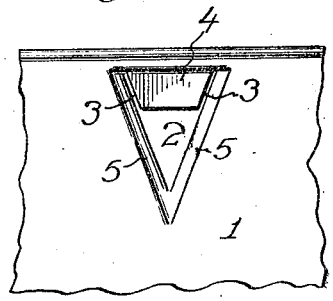
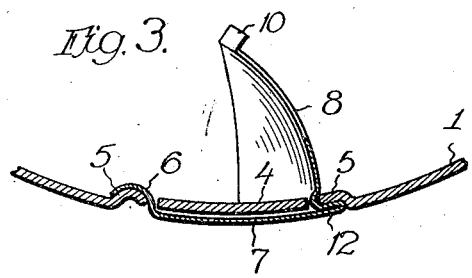
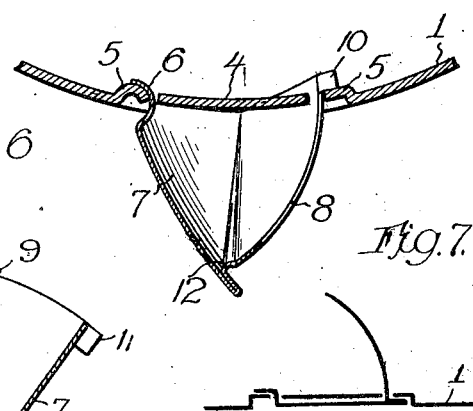
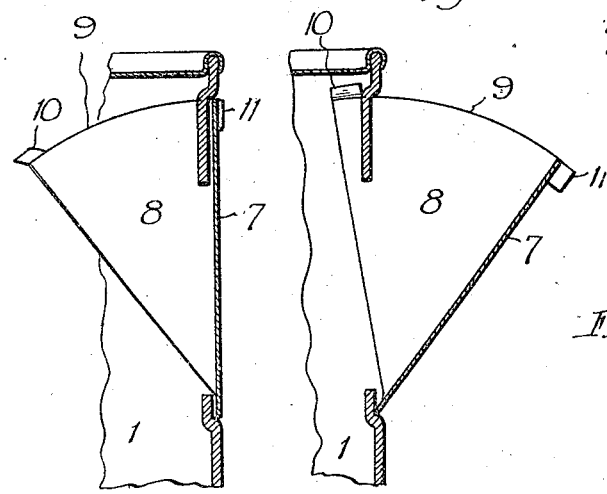
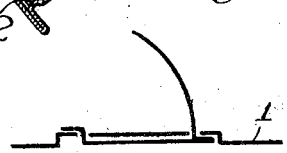
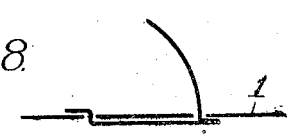
Inventor
George W Blake
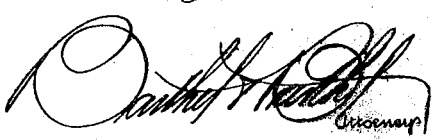

UNITED STATES PATENT OFFICE.

GEORGE W. BLAKE, OF WYANDOTTE, MICHIGAN.

POURING-SPOUT.

1,124,996.  Specification of Letters Patent.  Patented Jan. 12, 1915.

Application filed December 8, 1913. Serial No. 805,227.

*To all whom it may concern:*

Be it known that I, GEORGE W. BLAKE, a citizen of the United States of America, residing at Wyandotte, in the county of Wayne and State of Michigan, have invented certain new and useful Improvements in Pouring-Spout, of which the following is a specification, reference being had therein to the accompanying drawings.

This invention relates to a pouring spout for receptacles and more especially to an arrangement thereof whereby the receptacle is sealed by the spout when the latter is in closed position and whereby when the spout is opened, all the contents of the receptacle may be readily poured out.

The invention also includes an arrangement of parts that obviates the necessity of any hinge connection between the spout and the receptacle while at the same time the spout is firmly held in open or closed position.

The invention consists in the matters hereinafter set forth and more particularly pointed out in the appended claims.

In the drawings, Figure 1 is a view of a receptacle fitted with a spout that embodies features of the invention shown in closed position; Fig. 2 is a view in detail of the receptacle showing the pouring opening with the spout removed; Fig. 3 is a view in detail in transverse section, with the parts enlarged, showing the spout in closed position; Fig. 4 is a similar view showing the spout in open position; Figs. 5 and 6 are views in detail showing the spout in open and closed position respectively taken in longitudinal section; Figs. 7 and 8 are views illustrating diagrammatically slight modifications in the construction of the spout; and Fig. 9 is a diagrammatic view of a modification of the opening and spout.

Referring to the drawings, a receptacle 1 has a triangular shaped pouring opening 2 in its side wall, the margin of the opening being continued upwardly by a pair of divergent slots 3. The resultant depending tab 4 together with the marginal portions 5 of the wall around the opening may be off-set to form a slight depression in the wall.

A two sided V-shaped spout is formed with one marginal inset portion 6 that corresponds in length to one of the sides of the pouring opening and the adjacent slot continuation 3 thereof. The adjacent side 7 of the trough is arranged and proportioned to overlie the opposite margins 5 of the pouring opening when the spout is in the position shown in Fig. 3. If the marginal portion 5 of the opening is inset the hinge portion 6 may be slightly rounded to conform to this inset portion which as indicated in Figs. 3 and 4 may likewise be slightly curved so that the flange 6 may rock smoothly thereon. Preferably the spout is of one piece of sheet metal and in such instance the other side 8 is reverted to reinforce that portion of the side 7 which overlies the margin 5 of the opening when the spout is in closed position and to provide the necessary overlap for covering the opening. The side 8 is likewise curved with its axis of curvature substantially co-incident with the line on which the side 7 rocks in the opening 2 and the upper edge 9 of the curved side 8 is likewise curved on an arc whose center is substantially the lower apex of the spout so that the side always extends from the apex of the opening to the upper margin thereof in all positions of the spout. A suitably arranged tab or ear 10 on the margin prevents the curved side 8 from being withdrawn fully from the opening. As a further detail of construction a finger pull 11 may be added if desired and that portion of the wall 8 adjacent the reverted part may be given a slight inset bend as indicated at 12 the parts being so proportioned that when the spout is closed as indicated in Fig. 3, the margin 5 of the receptacle wall snaps into the resultant groove caused by this off-set and is held yieldingly in closed position.

It is to be understood that the wall 7 conforms to the shape of the receptacle wall in which the spout is inserted, that is, it may be curved or straight. The flange 6 need not be bent but may be a plane off-set portion of the wall 7 as indicated in Fig. 7 and as also shown in Fig. 7, the bend 12 may be omitted. As a further modification the marginal portions 5 that are inset in the preferred construction may be omitted as shown in Fig. 8.

It is also clear that while the slots that form extensions of the side margins coöperate with the depending portion 4 of the wall to hold the spout, the slots may be omitted as the sides of the opening are substantially equal in length to the inserted flange 6 of the spout, and the latter is therefore constrained to remain in operative position as it is longer than the altitude of the triangular opening as the flange cannot swing inwardly toward the medial axis of the triangle because of contact with the horizontal margin thereof. Such an opening is shown in Fig. 9 with the sides well flared so as to increase the length thereof relative to the altitude and to insure thereby a proper holding of the spout, after considerable wear.

In operation after the spout is formed up, the free margin of the curved wall with its stop ear 10 and the flange portion 6 of the other wall are readily inserted in the upper opening, the spout being thereby held therein because of the position and arrangement of the parts, the flange 6 being secured against movement toward the center of the triangle by the contact of the margins of the opening at the ends of the side to which the flange is applied. When thus inserted the spout is readily swung in or out and because of its position and the disposition of the pouring opening, the entire contents of the receptacle may be discharged without trouble. When the spout is closed it effectively seals the opening and as it is substantially flush with the outer wall of the receptacle it does not increase the shipping dimensions of the latter. There is no hinge tab or slot necessary and the construction is consequently readily made at slight cost.

Obviously, changes in the details of construction may be made without departing from the spirit of my invention and I do not care to limit myself to any particular form or arrangement of parts.

What I claim is:—

1. In a receptacle having a pouring opening in one of the walls thereof with convergent lateral margins, a spout having divergent sides, the free marginal portion of one of the sides being inserted in the opening and confined as a pivotal support for the spout in contact with one of the lateral margins by the sides of the opening adjacent that margin and the opposite side of the spout being held in sliding engagement with the other convergent margin by the sides of the opening adjacent that margin.

2. In a receptacle having a pouring opening in one of the walls thereof with convergent lateral margins, a spout having divergent sides, the free marginal portion of one of the sides being inserted in the opening and confined as a pivotal support for the spout in contact with one of the lateral margins by the sides of the opening adjacent that margin and the opposite side of the spout being held in sliding engagement with the other convergent margin by the sides of the opening adjacent that margin, the upper margin of the latter side being curved to contact with the adjacent side of the opening in all positions assumed by the spout.

3. In a receptacle having a substantially triangular pouring opening in one of the walls thereof, a spout having divergent sides, the free marginal portion of one of the sides being inserted in the opening and confined as a pivotal support in contact with one of the lateral margins of the opening by the sides of the opening adjacent that margin and the opposite side of the spout being held in sliding engagement with the adjacent margin of the opening with the sides of the opening adjacent that margin, the side that operates as a pivotal support being adapted to seal the opening when the spout is in closed position.

4. In a receptacle having a pouring opening in one of the walls thereof with convergent lateral margins, a V-shaped spout, the free marginal portion of one of the sides thereof being off-set and secured in the opening against one of the convergent lateral margins by the adjacent sides of the opening and the other side of the spout being curved on an axis substantially co-incident with the axis of motion of the spout in the opening and being held in sliding engagement with the other convergent margin of the opening by the adjacent sides of the opening.

5. In a receptacle having a substantially triangular opening in one of the walls thereof, a V-shaped spout formed of a blank folded on itself to provide divergent sides, the free lateral margin of one of the sides being inset and being held in contact in the opening with one of the margins thereof by the adjacent sides of the opening and the opposite side of the spout being curved with an axis substantially co-incident with the line of contact of the off-set margin with the opening side and being held in sliding engagement with the adjacent margin of the opening in all positions of the spout, the side having the off-set margin being adapted to seal the opening when the spout is turned inwardly against the wall of the receptacle.

6. In a receptacle having substantially triangular pouring opening in one of the walls thereof, a spout formed of a blank bent along a medial line to form divergent sides, one of the sides being extended beyond the line of the other side, the free marginal portion of the extended side being inset and being held in the opening in contact with one of the sides by the other sides of the opening and the inset wall being held in sliding engagement with the opposite side of the opening, the portion of the inset wall at the point of junction with the other wall being inset to interlock with the margin of the wall opening when the spout is in closed position.

In testimony whereof I affix my signature in presence of two witnesses.

GEORGE W. BLAKE.

Witnesses:
    C. R. STICKNEY,
    ANNA M. DORR.